(12) United States Patent
Guwang et al.

(10) Patent No.: US 12,710,300 B1
(45) Date of Patent: Aug. 18, 2026

(54) METHOD FOR MEASURING THE FLOW RATE OF A FLUID IN A PIPE

(71) Applicant: INTEGRA METERING SAS, Blagnac (FR)

(72) Inventors: Marcel Guwang, Lacroix-Falgarde (FR); Maxime Morin, Pechbusque (FR); Alain Ramond, Toulouse (FR)

(73) Assignee: SONTEX AG, Sonceboz-sombeval (CH)

( * ) Notice: Subject to any disclaimer, the term of this patent is extended or adjusted under 35 U.S.C. 154(b) by 454 days.

(21) Appl. No.: 18/027,628

(22) PCT Filed: Sep. 21, 2021

(86) PCT No.: PCT/FR2021/051618

§ 371 (c)(1),
(2) Date: Mar. 22, 2023

(87) PCT Pub. No.: WO2022/064133

PCT Pub. Date: Mar. 31, 2022

(30) Foreign Application Priority Data

Sep. 22, 2020 (FR) ...................................... 2009590

(51) Int. Cl.
*G01F 1/667* (2022.01)

(52) U.S. Cl.
CPC .................................. *G01F 1/667* (2013.01)

(58) Field of Classification Search
CPC ...................................................... G01F 1/667
USPC ...................................................... 73/861.28
See application file for complete search history.

(56) References Cited

U.S. PATENT DOCUMENTS

2008/0289434 A1 11/2008 Takemura et al.
2018/0245960 A1 8/2018 Kishiro et al.

FOREIGN PATENT DOCUMENTS

EP 1913342 4/2008
EP 3355035 A1 * 8/2018 ............ G01F 1/668
EP 3611480 2/2020
EP 3611480 A1 * 2/2020 ............ G01F 1/667
JP 2001235353 8/2001
JP 5123469 1/2013

OTHER PUBLICATIONS

Chen et al., "Design of a High Precision Ultrasonic Gas Flowmeter", Sensors 2020, 20, 4804; doi:10.3390/s20174804 (Year: 2020).*
International Search Report dated Jan. 4, 2022.

* cited by examiner

*Primary Examiner* — Nathaniel T Woodward
(74) *Attorney, Agent, or Firm* — IPSILON USA, LLP

(57) ABSTRACT

A method is provided for measuring the flow rate of a fluid in a pipe using at least two ultrasonic transducers. The method includes a succession of cycles (35) of transmissions, each comprising a sub-cycle A in which an ultrasonic wave is transmitted by a first transducer and a sub-cycle B in which an ultrasonic wave is transmitted by a second transducer. The propagation times of these two waves are measured, wherein the order between the sub-cycle A and the sub-cycle B is reversed between the successive transmission cycles, and a flow rate is calculated from an average of: a difference between the two measured propagation times of a given transmission cycle, and a difference between the two measured propagation times of a second transmission cycle following the given transmission cycle.

9 Claims, 3 Drawing Sheets

20
27
23b
22
23a
25
24
21
26
22

METHOD FOR MEASURING THE FLOW RATE OF A FLUID IN A PIPE

RELATED APPLICATION

This application is a National Phase of PCT/FR2021/051618 filed on Sep. 21, 2021, which claims the benefit of priority from French Patent Application No. 20 09590, filed on Sep. 22, 2020, the entirety of which are incorporated by reference.

TECHNICAL FIELD

The invention relates to a method for measuring the flow rate of a fluid in a pipe. The invention also relates to a flowmeter adapted to implement such a flow rate measurement method.

PRIOR ART

A method for measuring a flow rate of fluid flowing in the pipe between two ultrasound transducers is already known, notably from US 2011/0246098. The measurement method comprises a succession of cycles, referred to as transmission cycles, for measuring a time for an ultrasound wave to be propagated between the two transducers. In particular, each transmission cycle comprises:

- a subcycle A' comprising:
  - a step of the first ultrasound transducer transmitting an ultrasound wave,
  - a step of the second ultrasound transducer receiving said ultrasound wave,
  - a step of measuring a time for the ultrasound wave to be propagated from the first ultrasound transducer to the second ultrasound transducer,
- a subcycle B' comprising:
  - a step of the second ultrasound transducer transmitting an ultrasound wave,
  - a step of the first ultrasound transducer receiving said ultrasound wave,
  - a step of measuring a time for the ultrasound wave to be propagated from the second ultrasound transducer to the first ultrasound transducer.

Thus, the ultrasound transducer operating as a transmitter during a given cycle operates as a receiver during the cycle which follows this given cycle. Likewise, the ultrasound transducer operating as a receiver during a given cycle operates as a transmitter during the cycle which follows this given cycle.

In particular, the transmission step of the second subcycle carried out of a transmission cycle succeeds the reception step of the first subcycle carried out of this same transmission cycle after a duration of a few milliseconds (4 ms), the time over which the ultrasound fades away.

This method further comprises a step of computing a fluid flow rate, in which the fluid flow rate is computed on the basis of a difference between the measured propagation time of the first measurement cycle carried out and the measured propagation time of the second measurement cycle carried out.

The fact of computing the fluid flow rate on the basis of a difference between two propagation times makes it possible to obtain more reliable results than if the fluid flow rate was computed on the basis of a single propagation time. Specifically, computing the fluid flow rate on the basis of a difference between two propagation times makes it possible to reduce the influence of the environment on the measurements of the propagation times.

This method may be repeated so as to measure several flow rates at different instants.

The inventors have observed that the precision of the flow rates computed according to such a flow rate measurement method is not always regular. Thus, the flow rates computed by such a flow rate measurement method therefore prove to be relatively unreliable.

Methods for measuring a flow rate of fluid flowing in a pipe between two transducers are also known which use a method for measuring time of flight via phase equalization. This measurement method is also known under the name "phase shift". The documents JP 5123469 and EP 3 355 035 describe such methods for measuring the propagation time of a wave stream via phase equalization. More specifically, this method consists in transmitting, by means of a transmitting first transducer, an ultrasound wave stream in the direction of a second transducer operating as a receiver. The propagation time of the ultrasound wave stream is then determined by the phase difference measured between the transmitted wave stream and the received wave stream. This measurement method involves the speed of the stream of fluid which flows in the pipe being computed in the frequency domain.

The precision of this measurement method decreases beyond a certain distance between the transmitting transducer and the receiving transducer. In addition, this method requires a large number of electrical pulses to be used, which involves a prolonged activation time of the electronics and therefore significant energy consumption.

The invention aims to mitigate all of these drawbacks.

OBJECTS AND SUMMARY

The invention therefore aims to propose a method for measuring the flow rate of a fluid which makes it possible to determine reliable and precise flow rates.

The invention also aims to propose such a flow rate measurement method which is simple, quick and inexpensive in terms of energy.

The invention also aims to propose a flowmeter adapted to implement such a flow rate measurement method.

The invention therefore relates to a method for measuring the flow rate of a fluid in a pipe, the flow rate being measured using at least two ultrasound transducers, the method comprising generating successive cycles, referred to as transmission cycles, which is controlled by a control unit, each transmission cycle comprising:

- a subcycle A comprising:
  - a step of a first ultrasound transducer from among said at least two ultrasound transducers transmitting an ultrasound wave,
  - a step of a second ultrasound transducer from among said at least two ultrasound transducers receiving said ultrasound wave,
  - a step of measuring a time for the ultrasound wave to be propagated from the first ultrasound transducer to the second ultrasound transducer,
- a subcycle B comprising:
  - a step of the second ultrasound transducer transmitting an ultrasound wave,
  - a step of the first ultrasound transducer receiving said ultrasound wave,
  - a step of measuring a time for the ultrasound wave to be propagated from the second ultrasound transducer to the first ultrasound transducer, the first subcycle A and the subcycle B of the same transmission cycle succeeding one another in a given order, characterized in that the order of the subcycle A and the subcycle B of a given transmission cycle is reversed with respect to the order of the subcycle A and the subcycle B of a transmission cycle directly preceding said given transmission cycle, and in that it comprises at least one fluid flow rate computation step, in which a flow rate of the fluid flowing in the pipe is computed on the basis of an average between:

a difference between the propagation time measured for the subcycle A and the propagation time measured for the subcycle B of the same given transmission cycle, and a difference between the propagation time measured for the subcycle A and the propagation time measured for the subcycle B of the same transmission cycle directly succeeding the given transmission cycle.

The expression "the cycle directly succeeding the given cycle" denotes the first cycle which follows the given cycle in the succession of cycles which are carried out in the measurement method. Likewise, the expression "the cycle directly preceding the given cycle" denotes the first cycle which precedes the given cycle in the set of cycles which are carried out in the measurement method.

In particular, the difference found during the flow rate computation step is multiplied by −1 every other cycle in order to keep a result with the same sign.

In certain advantageous embodiments according to the invention, a given first transmission cycle is separated from a second transmission cycle directly preceding the given first transmission cycle by a duration, referred to as the intercycle duration, which is greater than or equal to 15 ms. In particular, said intercycle duration may be between 15 ms and 4000 ms (4 seconds), notably between 125 ms and 4000 ms (4 seconds), more particularly between 250 ms and 2000 ms (2 seconds), for example in the order of 500 ms.

Furthermore, in certain advantageous embodiments according to the invention, the subcycle A and the subcycle B of the same transmission cycle are separated from one another by a duration, referred to as the intracycle duration, which is less than or equal to 10 ms. In particular, said intracycle duration may be between 1 ms and 10 ms, for example in the order of 4 ms.

Preferably, the fluid flow rate is determined on the basis of a predetermined table in which propagation time difference results are associated with flow rates. The table may also take the temperature of the fluid into account.

In certain advantageous embodiments according to the invention, the flow rate measurement method comprises a step of at least partially putting the control unit on standby between each transmission cycle. Preferably, when the control unit is turned on, the subcycle A and the subcycle B are each carried out over a stabilization period of the electronic components of the control unit. Thus, the ultrasound wave transmitted during the subcycle A and the ultrasound wave transmitted during the subcycle B of each transmission cycle are each transmitted over a predefined transmission time interval. For example, the predefined transmission time interval may be less than 1 μs.

After the control unit has been turned on, carrying out the subcycle A and the subcycle B during the stabilization period makes it possible to reduce the operating time of the control unit. Furthermore, the instability of the electronic components of the control unit is compensated for by the constant chronology and time interval of the steps of each subcycle A, B. Specifically, during a first cycle, the steps of each subcycle A, B are carried out in the same state of instability as the steps of each subcycle A, B of a second cycle which succeeds the first cycle. More particularly, with the order of the subcycle A and the subcycle B being reversed, on the one hand, the subcycle B of the second cycle is carried out according to a chronology and a time interval which are identical to the subcycle A of the first cycle and, on the other hand, the subcycle A of the second cycle is carried out according to a chronology and a time interval which are identical to the subcycle B of the first cycle. The features of this embodiment make it possible to increase the precision with which the propagation time is measured and to reduce the energy consumption of the flowmeter.

In some embodiments of the invention, the ultrasound wave is generated by a transducer operating as a transmitter on the basis of a square electrical pulse. Unlike the phase equalization measurement method, transmitting a single electrical pulse in order to generate an ultrasound wave makes it possible to improve the precision of the measurement by providing an ultrasound wave the signal of which is short. For example, the signal may have a duration of half a wavelength. The activation time of the electronics of the flowmeter and the electrical energy consumption are thus reduced.

The invention also extends to a flowmeter adapted to implement a method according to the invention.

In particular, the invention extends to a flowmeter comprising:

at least two ultrasound transducers which are adapted to be joined to a pipe, a control unit programmed to control generation of successive cycles, referred to as transmission cycles, each transmission cycle comprising:

a subcycle A comprising:

a step of a first ultrasound transducer from among said at least two ultrasound transducers transmitting an ultrasound wave, a step of a second ultrasound transducer from among said at least two ultrasound transducers receiving said ultrasound wave, a step of measuring a time for the ultrasound wave to be propagated from the first ultrasound transducer to the second ultrasound transducer, a subcycle B comprising:

a step of the second ultrasound transducer transmitting an ultrasound wave, a step of the first ultrasound transducer receiving said ultrasound wave, a step of measuring a time for the ultrasound wave to be propagated from the second ultrasound transducer to the first ultrasound transducer, the subcycle A and the subcycle B of the same transmission cycle succeeding one another in a given order, characterized in that the order of the subcycle A and the subcycle B of a given transmission cycle is reversed with respect to the order of the subcycle A and the subcycle B of a transmission cycle directly preceding said given transmission cycle, and in that the control unit is programmed to carry out at least one fluid flow rate computation step in which a flow rate of the fluid flowing in the pipe is computed on the basis of an average between:

- a difference between the propagation time measured for the subcycle A and the propagation time measured for the subcycle B of the same given transmission cycle, and
- a difference between the propagation time measured for the subcycle A and the propagation time measured for the subcycle B of the same transmission cycle directly succeeding the given transmission cycle.

For example, the first transducer and the second transducer are adapted to be mounted on a pipe so as to be arranged opposite one another in a diagonal direction with respect to a longitudinal axis of the pipe. Nevertheless, nothing prevents a flowmeter comprising two transducers which are adapted to be arranged inside the pipe opposite one another on the longitudinal axis of the pipe from being provided. Moreover, it is also possible to provide a flowmeter comprising a single ultrasound transducer and an ultrasound wave reflector which are arranged inside the pipe. This single ultrasound transducer is then placed facing the reflector so that this transducer may transmit then receive ultrasound waves by reflecting them on the reflector. In this case, the first transducer and the second transducer are the same.

In certain advantageous embodiments according to the invention, the flowmeter comprises said pipe on which the two ultrasound transducers are mounted, this pipe having two longitudinal ends comprising a connecting member.

The invention also relates to a flow rate measurement method and a flowmeter characterized, in combination or otherwise, by all or some of the features mentioned above or below. Whatever formal presentation is given of them, unless explicitly stated otherwise, the various features mentioned above or below should not be considered to be intimately or inextricably linked to one another, it being possible for the invention to relate to only one of these structural or functional features, or only some of these structural or functional features, or only a part of one of these structural or functional features, or indeed any grouping, combination or juxtaposition of all or some of these structural or functional features.

DESCRIPTION OF THE DRAWINGS

Other aims, features and advantages of the invention will become apparent on reading the following non-limiting description of some of its possible embodiments, which refers to the appended figures, in which.

DESCRIPTION OF THE EMBODIMENTS

Figure 1:
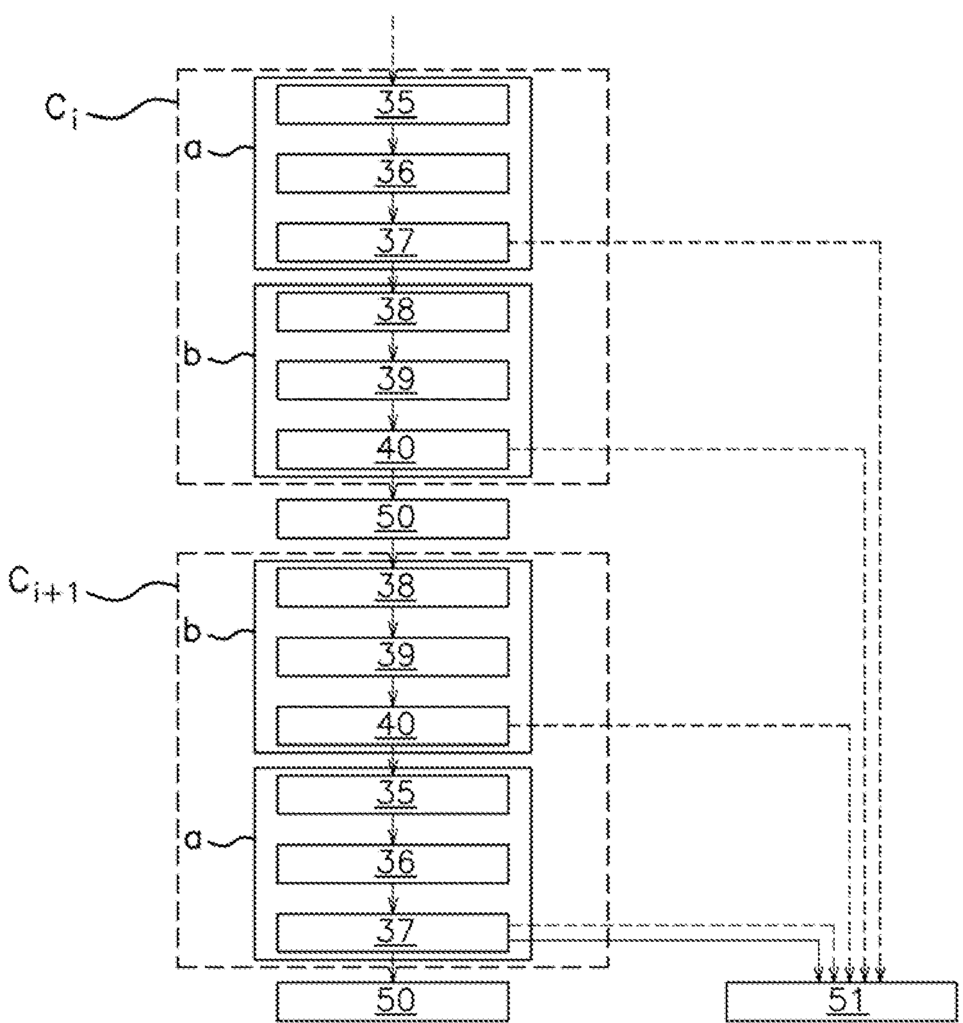
FIG. 1 is a flow chart showing four successive transmission cycles of a flow rate measurement method according to the invention.

A method 28 for measuring the flow rate of a fluid flowing in a pipe is shown according to one embodiment of the invention in FIG. 1. This flow rate measurement method 28 may be implemented by any type of ultrasound flowmeter operating on the basis of measurements of differences in the propagation times of the ultrasound waves by at least one ultrasound transducer.

Figure 2:
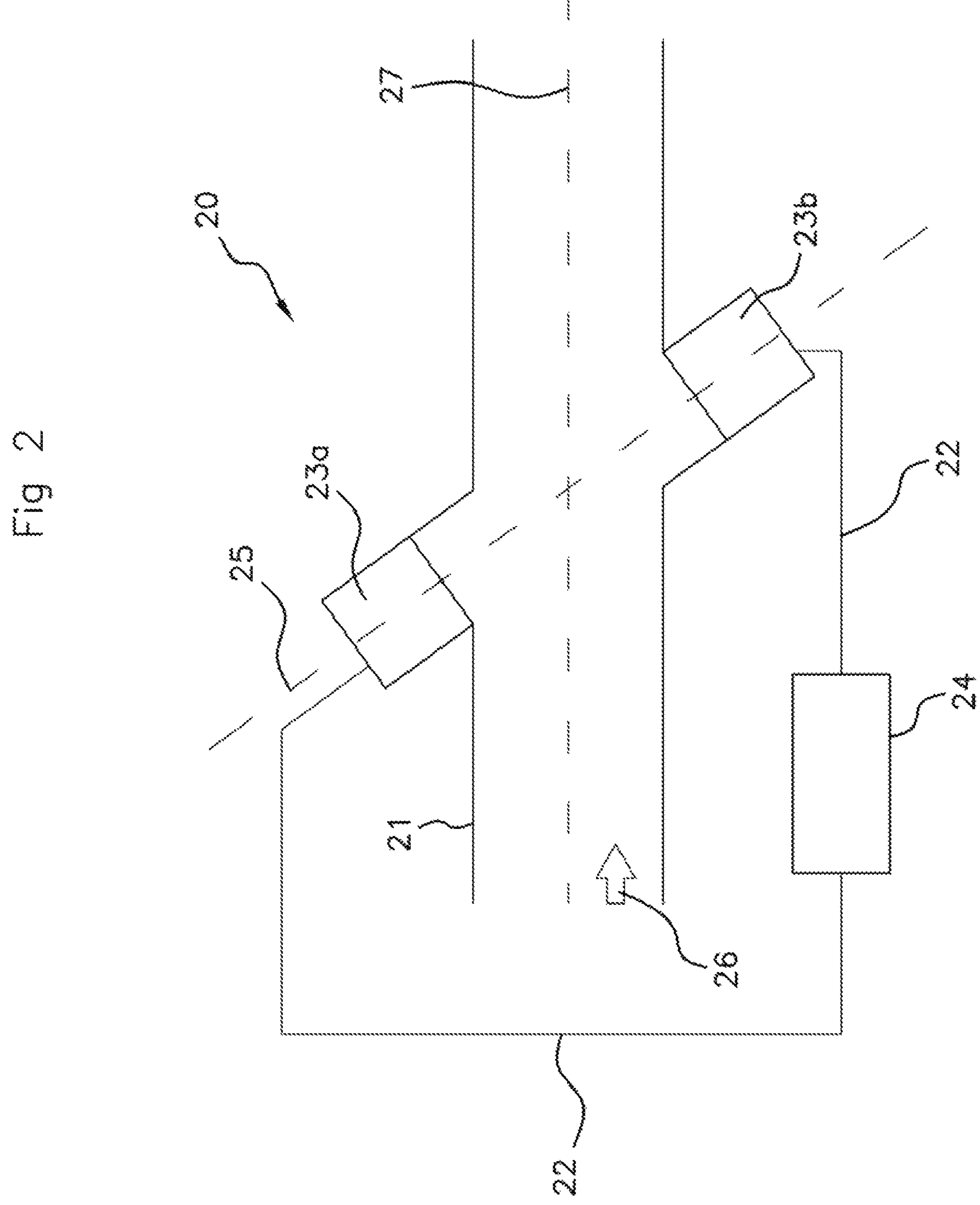
FIG. 2 is an overview diagram of a longitudinal cross section of a flowmeter according to one embodiment of the invention, FIG. 3 comprises time diagrams showing four successive cycles of a flow rate measurement method according to the invention.

By way of example, the flowmeter 20 shown in FIG. 2 is adapted to implement the measurement method 28. This flowmeter 20 comprises a first ultrasound transducer 23*a* and a second ultrasound transducer 23*b* which are mounted on a pipe 21 extending longitudinally along and about a theoretical longitudinal axis 27. The pipe 21 comprises a wall delimiting a passage in which a fluid 26 may flow. The transducers 23*a*, 23*b* are mounted on the wall of the pipe 21 and arranged opposite one another in a diagonal direction 25 with respect to the longitudinal axis 27 of the pipe 21. Each transducer 23*a*, 23*b* is adapted to transmit ultrasound waves and to receive ultrasound waves. Thus, each transducer 23*a*, 23*b* may operate as a transmitting transducer so as to be able to transmit ultrasound waves or indeed as a receiving transducer so as to be able to receive ultrasound waves. In particular, when a transducer 23*a*, 23*b* operates as a transmitting transducer, this transducer 23*a*, 23*b* is adapted to convert an electrical signal into an ultrasound wave. Moreover, when a transducer 23*a*, 23*b* operates as a receiving transducer, this transducer 23*a*, 23*b* is adapted to convert an ultrasound wave into an electrical signal.

The transducers 23*a*, 23*b* are arranged so that an ultrasound wave transmitted by one of these two transducers may be propagated through the pipe 21 in said diagonal direction 25 in order to be received directly by the other transducer without intermediate reflection of the ultrasound wave on a wall of the pipe. As a variant, nothing prevents, for example, a flowmeter comprising two transducers which are arranged inside the pipe opposite one another on the longitudinal axis of the pipe from being provided. Moreover, it is also possible to provide a flowmeter comprising a single ultrasound transducer and an ultrasound wave reflector which are arranged inside the pipe. This single ultrasound transducer is then placed facing the reflector so that this transducer may transmit ultrasound waves then receive them by reflecting them on the reflector. This transducer then operates first of all as a transmitter then as a receiver. The flowmeter 20 also comprises a control unit 24 connected to the transducers 23*a*, 23*b* by electrically conductive connections 22. The control unit comprises at least one integrated circuit, notably chosen from among a microcontroller, a microprocessor, an application-specific integrated circuit (ASIC) and a programmable logic circuit. The control unit also comprises a memory. Preferably, the control unit also comprises a pulse generator, a signal amplifier, a zero-crossing detector, a time capture, a sequencing state machine and a computing processor. In particular, the control unit 24 comprises at least one real-time clock. Preferably, the control unit 24 comprises two clocks. A first clock is used to count most of the propagation time. This clock operates at a frequency which is greater than 10 MHz, for example in the order of 16 MHz. A second clock is used to obtain a precise measurement of the propagation time. This second clock is triggered as close as possible to the moment at which the ultrasound wave is received by the transducer operating as a receiver. This second clock operates at a frequency which is greater than that of the first clock, notably at a frequency which is greater than 1 GHZ, for example in the order of 26 GHZ.

This control unit 24 is adapted to control each transducer 23*a*, 23*b* so as to make them operate as a transmitting transducer or as a receiving transducer. In particular, when one of the two transducers 23*a*, 23*b* is controlled so as to operate as a transmitting transducer, the other transducer 23*a*, 23*b* is controlled so as to operate as a receiving transducer.

More particularly, the control unit 24 is adapted to supply the transducer 23*a*, 23*b* controlled as a transmitting transducer with an electrical signal, referred to as the control signal, via the electrically conductive connection 22 connecting the control unit 24 to this transducer 23*a*, 23*b* controlled as a transmitting transducer. This transducer 23*a*, 23*b* operating as a transmitting transducer is thus adapted to convert this control signal into an ultrasound wave which is then propagated through the pipe 21 to the other transducer 23*a*, 23*b* operating as a receiving transducer.

Moreover, the control unit 24 is adapted to acquire an electrical signal, referred to as the reception signal, generated by the transducer 23*a*, 23*b* controlled so as to operate as a receiving transducer, this reception signal being generated on the basis of an ultrasound wave received by this transducer 23*a*, 23*b* operating as a receiving transducer and transmitted to the control unit 24 via the electrically conductive connection 22 connecting the control unit 24 to this transducer 23*a*, 23*b* operating as a receiving transducer.

Furthermore, the control unit is adapted to measure a time Tprop for an ultrasound wave to be propagated in the pipe 21 between a transducer 23*a*, 23*b* transmitting this ultrasound wave and the other transducer 23*a*, 23*b*. For this purpose, the control unit uses its pair of clocks to measure the propagation time on the basis of a control signal transmitted by the processing unit 24 and of a reception signal transmitted by the receiving transducer and acquired by the processing unit 24.

Thus, the control unit 24 is adapted to control generation of successive cycles, referred to as transmission cycles, as will presently be explained with reference to FIGS. 1 to 3, notably in the non-limiting case of four successive transmission cycles labeled $C_1$ to $C_4$.

Each transmission cycle $C_i$ comprises:

- a subcycle A comprising:
  - a step 35 of the first ultrasound transducer 23*a* transmitting an ultrasound wave,
  - a step 36 of the second ultrasound transducer 23*b* receiving said ultrasound wave,
  - a step 37 of measuring a time for the ultrasound wave to be propagated from the first ultrasound transducer 23*a* to the second ultrasound transducer 23*b,*
- a subcycle B comprising:
  - a step 38 of the second ultrasound transducer 23*a* transmitting an ultrasound wave,
  - a step 39 of the first ultrasound transducer 23*b* receiving said ultrasound wave,
  - a step 40 of measuring a time for the ultrasound wave to be propagated from the second ultrasound transducer 23*a* to the first ultrasound transducer 23*b,*
- in particular, the subcycle A and the subcycle B of same the transmission cycle $C_i$ are carried out in a given order. Moreover, each transmission cycle $C_i$ comprises a single subcycle A and a single subcycle B.

Figure 3:
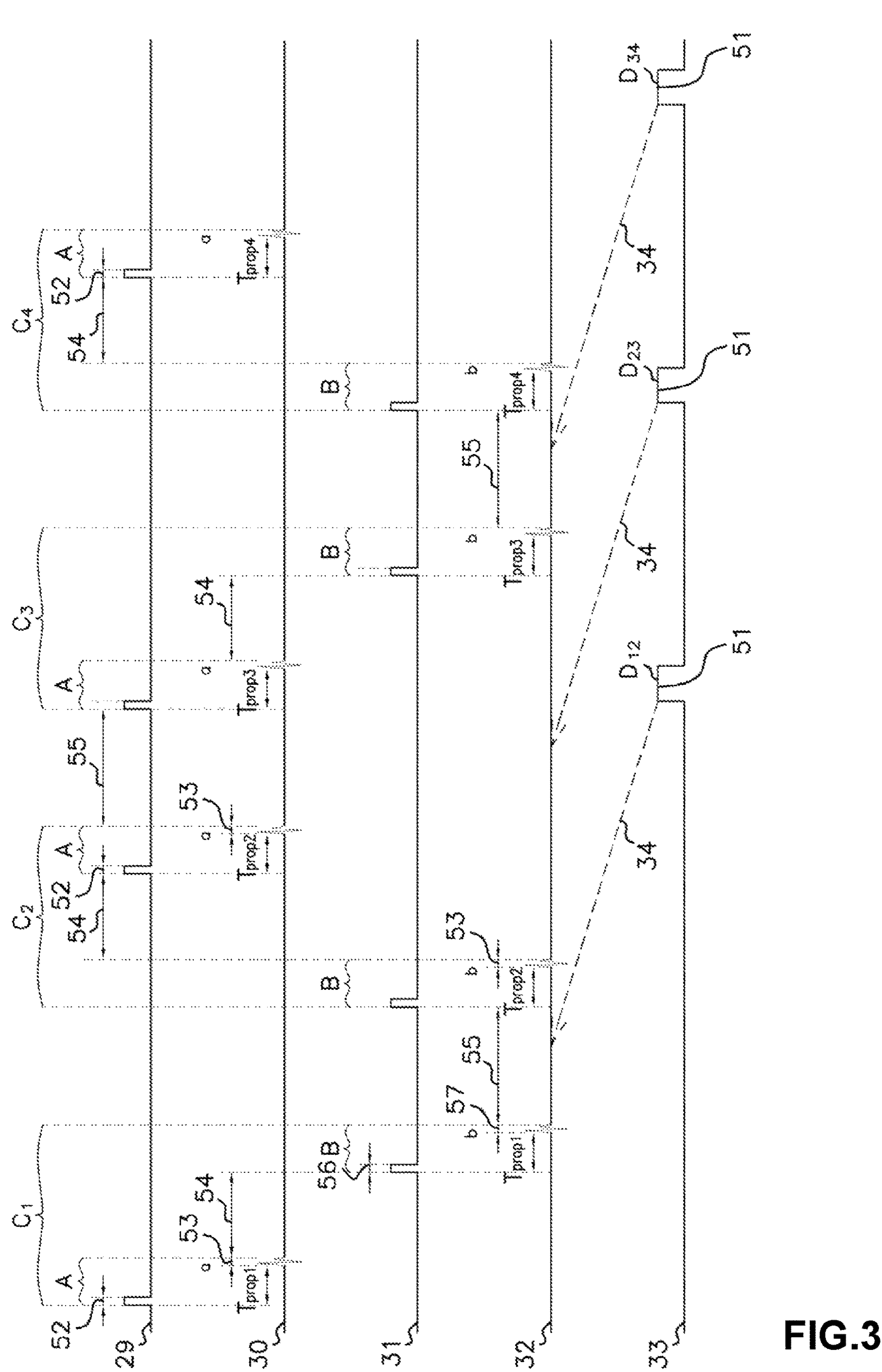

In particular, the ultrasound wave transmitted during the subcycle A and the ultrasound wave transmitted during the subcycle B of each transmission cycle $C_i$ are each transmitted over a predefined transmission time interval 52, 56 (see FIG. 3). Moreover, the ultrasound wave transmitted during the subcycle A and the ultrasound wave transmitted during the subcycle B of each transmission cycle $C_i$ are each received over a reception time interval 53, 57 (see FIG. 3).

More particularly, the ultrasound wave is generated by the transducer operating as a transmitter on the basis of a square electrical pulse, for example of a duration of half a wavelength, or indeed on the basis of a square signal of a greater duration.

In particular, the predefined transmission time interval 52, 56 is less than 1 μs, more particularly between 100 ns and 250 ns, for example in the order of 125 ns. Moreover, the predefined reception time interval 53, 57 is less than 40 μs, more particularly between 2 μs and 20 μs, for example in the order of 5 μs.

The flow rate measurement method 28 makes it possible to measure a flow rate of a fluid 26 flowing in the pipe 21 between the two transducers 23*a*, 23*b* at several given instants.

The description of this method will, below, be based notably on FIG. 3, which shows time diagrams corresponding to four successive cycles $C_1$ to $C_4$.

The line 29 is a time diagram showing the transmission steps 35 for which the transducer 23*a* operates as a transmitting transducer. When a transmission step 35 is in progress, it is shown by a pulse on the line 29.

The line 30 is a time diagram showing the reception steps 36 for which the transducer 23*b* operates as a receiving transducer. When a reception step 36 is in progress, it is shown by a pulse on the line 30.

The line 31 is a time diagram showing the transmission steps 38 for which the transducer 23*b* operates as a transmitting transducer. When a transmission step 38 is in progress, it is shown by a pulse on the line 31.

The line 32 is a time diagram showing the reception steps 39 for which the transducer 23*a* operates as a receiving transducer. When a reception step 39 is in progress, it is shown by a pulse on the line 32.

The line 33 is a time diagram showing flow rate computation steps, which are described in more detail below. When a flow rate computation step 51 is in progress, it is shown by a pulse on the line 33. The arrows 34 between the computation steps and the transmission cycles indicate the moment which the flow rate is computed for (this computed flow rate then being representative of the flow rate of fluid 26 flowing in the pipe 21 at this moment pointed at by the arrow).

The flow rate measurement method according to the invention comprises generating successive transmission cycles $C_i$, which is controlled by the control unit 24. As seen above, each transmission cycle comprises a subcycle A comprising a transmission step 35 over a predefined transmission time interval 52, a reception step 36 over a predefined reception time interval 53 and a step 37 of measuring a propagation time $Tprop^a$. Each transmission cycle also comprises a subcycle B comprising a transmission step 38 over a predefined transmission time interval 56, a reception step 39 over a predefined reception time interval 57 and a step 40 of measuring a propagation time $Tprop^b$. The measurement method comprises at least two transmission cycles. In FIGS. 1 and 3, four cycles $C_1$ to $C_4$ are shown. Throughout the text, what is meant by the term "directly", in particular in the expressions "cycle $C_i$ directly succeeding the given cycle $C_i$" and "cycle $C_{i-1}$ directly preceding the given cycle $C_i$" is that the cycle $C_i$ directly succeeding the given cycle $C_i$ corresponds to the first cycle carried out after the given cycle $C_i$ and that the cycle $C_{i-1}$ directly preceding the given cycle $C_i$ corresponds to the last cycle carried out before the given cycle $C_i$. The given cycle $C_i$ may correspond to any transmission cycle of a measurement method according to the invention.

The transducer 23*a*, 23*b* operating as a transmitting transducer (notably the transducer 23*a* in the example shown) for a subcycle A operates as a receiving transducer for the subcycle B. Moreover, the transducer 23*a*, 23*b* operating as a transmitting transducer (notably the transducer 23*b* in the example shown) for a subcycle A operates as a receiving transducer for the subcycle B. Thus, during each subcycle A, the ultrasound wave is transmitted by a first transducer (notably the transducer 23*a* in the example shown) operating as a transducer transmitting to the second transducer 23*a*, 23*b* operating as a receiving transducer. In other words, the ultrasound wave is transmitted in a first propagation direction with respect to the direction in which the fluid 26 flows, for example upstream. During each subcycle B, the ultrasound wave is transmitted by the second transducer (notably the transducer 23*b* in the example shown) operating as a transducer transmitting to the first transducer 23*a*, 23*b* operating as a receiving transmitter. In other words, the ultrasound wave is transmitted in a second propagation direction which is opposite to the first direction, for example downstream. Moreover, the order of the subcycle A and the subcycle B of a given transmission cycle is reversed with respect to a transmission cycle directly preceding said given transmission cycle. Thus, for example, in a given cycle $C_i$, the subcycle A is carried out before the subcycle B and, in a cycle $C_{i+1}$ directly succeeding the cycle $C_i$, the subcycle A is carried out after the subcycle B.

The cycles are separated from one another by a duration, referred to as the intercycle duration 55. Thus, a given cycle $C_i$ is separated from a cycle $C_{i-1}$ directly preceding this given cycle $C_i$ by said intercycle duration 55. This intercycle duration 55 is greater than or equal to 15 ms. In particular, said intercycle duration 55 may be between 125 ms and 4000 ms (4 seconds), notably between 250 ms and 4000 ms (4 seconds), more particularly between 250 ms and 2000 ms (2 seconds), for example in the order of 500 ms. The intercycle duration 55 may be variable. Nevertheless, preferably, the intercycle duration 55 is fixed. In particular, the pair of clocks makes it possible to start each transmission cycle after said intercycle duration 55.

Furthermore, for each transmission cycle, the subcycle A of this transmission cycle is separated from the subcycle B of this same transmission cycle by a duration, referred to as the intracycle duration 54, which is less than or equal to 10 ms. In particular, said intracycle duration 54 may be between 1 ms and 10 ms, for example in the order of 4 ms. The intracycle duration 54 may be variable. Nevertheless, preferably, the intracycle duration 54 is fixed. In particular, the pair of clocks makes it possible to start each transmission cycle after said intracycle duration 54.

Moreover, the method comprises at least one fluid flow rate computation step 51 in which a flow rate of fluid flowing in the pipe between a given cycle $C_i$ and a cycle $C_{i+1}$ directly succeeding this given cycle C; is computed. Each fluid flow rate computation step 51 may be carried out by the control unit 24. As a variant, nothing prevents a computing unit which is external to the control unit and makes it possible to carry out the flow rate computation steps from being provided. The flow rate computation steps are preferably carried out at the moment of the transmission cycles, as illustrated by the line 33 of FIG. 3. Nevertheless, the flow rate computation steps may also be carried out between the transmission cycles.

For each computation step 51, a flow rate of fluid flowing in the pipe between a given cycle $C_i$ and a cycle $C_{i+1}$ directly succeeding this given cycle $C_i$ is computed on the basis of a propagation time $$Tprop_i^a$$

measured during the subcycle A of this cycle $C_i$, of a propagation time $$Tprop_i^{b_1}$$

measured during the subcycle B of this given cycle $C_i$ and of a propagation time $$Tprop_{i+1}^a$$

measured during the subcycle A of the cycle $C_{i+1}$ and of a propagation time $$Tprop_{i+1}^b$$

measured during the subcycle B of the cycle $C_{i+1}$. In particular, this flow rate is computed on the basis of an average between:

a difference between the propagation time $$Tprop_i^a$$

measured for the subcycle A and the propagation time $$Tprop_i^b$$

measured for the subcycle B of the same given transmission cycle $C_i$ and a difference between the propagation time $$Tprop_{i+1}^a$$

measured foe the subcycle A and the propagation time $$Tprop_{i+1}^b$$

measured for the subcycle B of the same transmission cycle $C_{i+1}$ directly succeeding the given transmission cycle.

Thus, the flow rate of the fluid in the pipe between the given cycle $C_i$ and the cycle $C_{i+1}$ is computed on the basis of the following formula [Math. 1]:

$$\frac{\left(Tprop_i^a - Tprop_i^b\right) + \left(Tprop_{i+1}^b - Tprop_{i+1}^a\right)}{2}$$

where:

$$Tprop_i^a$$

is the propagation time of the ultrasound wave transmitted during a subcycle A of a given transmission cycle Ci, $$Tprop_i^b$$

is the propagation time of the ultrasound wave transmitted during a subcycle B of said given transmission cycle $C_i$, $$Tprop_{i+1}^b$$

is the propagation time of the ultrasound wave transmitted during a subcycle B of a transmission cycle $C_{i+1}$ directly succeeding said given transmission cycle $C_i$, $$Tprop_{i+1}^a$$

is the propagation time of the ultrasound wave transmitted during a subcycle A of the transmission cycle $C_{i+1}$ directly succeeding said given transmission cycle $C_i$.

For example, the flow rate of the fluid in the pipe between the cycle $C_2$ and the cycle $C_3$ is computed, during the computation step 51, on the basis of the following formula [Math. 2]:

$$\frac{(Tprop_2^a - Tprop_2^b) + (Tprop_3^b - Tprop_3^a)}{2}$$

where:

$$Tprop_2^a$$

is the propagation time of the ultrasound wave transmitted during a subcycle A of a given transmission cycle $C_2$, $$Tprop_2^b$$

is the propagation time of the ultrasound wave transmitted during a subcycle B of said given transmission cycle $C_2$, $$Tprop_3^b$$

is the propagation time of the ultrasound wave transmitted during a subcycle B of a transmission cycle $C_3$, $$Tprop_3^a$$

is the propagation time of the ultrasound wave transmitted during a subcycle A of the transmission cycle $C_3$, More particularly, preferably, the fluid flow rate is determined on the basis of a predetermined table in which propagation time difference results are associated with flow rates. The table may also take the temperature of the fluid into account.

In particular, as indicated by the dashed arrows 34 in FIG. 3, the computed flow rate $D_{12}$ corresponds to the flow rate of the fluid in the pipe between the cycle $C_1$ and the cycle $C_2$, the computed flow rate $D_{23}$ corresponds to the flow rate of the fluid in the pipe between the cycle $C_2$ and the cycle $C_3$, and the computed flow rate $D_{34}$ corresponds to the flow rate of the fluid in the pipe between the cycle $C_3$ and the cycle $C_4$.

A flow rate measurement method according to the invention makes it possible to obtain more reliable flow rates than those obtained by known flow rate measurement methods. Specifically, as seen above, the known flow rate measurement methods comprise a succession of cycles, referred to as transmission cycles, each comprising a subcycle A', which is similar to the subcycle A, and a subcycle B', which is similar to the subcycle B. During the subcycle A', the ultrasound wave is transmitted by a first ultrasound transducer to the second ultrasound transducer in a first direction with respect to the direction in which the fluid flows in the pipe. During the subcycle B', the ultrasound wave is transmitted by the second ultrasound transducer to the first ultrasound transducer in a second direction which is opposite to the first direction. The order of the subcycle A' and the subcycle B' of each transmission cycle is predefined and is the same for each transmission cycle. Moreover, the subcycle A' and the subcycle B' of each transmission cycle are separated from one another by a duration in the order of 4 ms. The flow rate is computed on the basis of a difference between the time for the ultrasound wave transmitted during the subcycle A' to be transmitted between the two ultrasound transducers and the time for the sound wave transmitted during the subcycle B' to be transmitted between the two ultrasound transducers.

The inventors have remarked that, in these known flow rate measurement methods, the flow rates computed on the basis of the times for the ultrasound waves to be propagated between the transducers are skewed because of an asymmetry in the operating conditions of the flowmeter between the two subcycles of the same transmission cycle. In other words, in the known flow rate measurement methods, the operating conditions of the flowmeter during the subcycle A' may be different from the operating conditions during the subcycle B'. For example, the measurement of the transmission time of the ultrasound wave transmitted during the subcycle B' may be skewed by echoes in the pipe of the ultrasound wave transmitted during the subcycle A' because of the duration between these two subcycles in the order of 4 ms. The computation of the flow rate may also be skewed by a modification of the temperature of the fluid flowing in the pipe or a modification of the temperature of the control unit between the subcycle A' and the subcycle B'.

A flow rate measurement method according to the invention makes it possible to compensate for the flow rate measurement errors which are due to the differences in the operating conditions of a flowmeter between the subcycle A and the subcycle B of the same transmission cycle by reversing the order of the subcycle A and the subcycle B between two successive transmission cycles and by computing the flow rate on the basis of measurements of transmission times measured during the subcycles A and the subcycles B of these two transmission cycles.

In particular, during a transmission cycle $C_i$, referred to as the first cycle, the operating conditions are different between the subcycle A and the subcycle B. For example, in the event that the subcycle A is carried out before the subcycle B, an echo of the ultrasound wave transmitted during the subcycle A may still be present in the pipe during the subcycle B, this interfering with the measurement of a transmission time of the ultrasound wave transmitted during this subcycle B. Nevertheless, in a transmission cycle $C_{i+1}$, referred to as the second cycle, directly succeeding said first cycle, the subcycle B is carried out before the subcycle A. Now, the intercycle duration 55 is long enough for the echoes of ultrasound waves in the pipes to dissipate. Thus, the subcycle B of the second cycle is carried out in conditions which are at least substantially identical to the conditions in which the subcycle A of the first cycle is carried out. Moreover, the subcycle A of the second cycle is carried out in conditions which are at least substantially identical to the conditions in which the subcycle B of the first cycle is carried out. The fact of computing a flow rate of the fluid flowing in the pipe on the basis of an average between a difference in the propagation times which are measured during the first cycle and a difference in the propagation times which are measured during the second cycle makes it possible to compensate for the errors induced by an asymmetry in the operating conditions between the subcycle A and the subcycle B of the same transmission cycle.

Thus, although the operating conditions are always different between the subcycle A and the subcycle B of the same transmission cycle, the flow rates computed according to a flow rate measurement method according to the invention are more precise and more reliable than those computed according to the known flow rate measurement methods.

Such a flow rate measurement method is relatively simple, quick and inexpensive to implement. In particular, the control unit may easily be programmed to be able to implement such a method (the intercycle duration 55 being fixed, reversing the order of the subcycle A and the subcycle B between the successive transmission cycles).

Furthermore, preferably, a measurement method according to the invention comprises a step 50 of at least partially putting the control unit 24 on standby between each transmission cycle during said intercycle duration 55. When the control unit 24 is put on standby, at least some of the electronic components of the control unit 24 are not turned on. In particular, the amplifier and the time counters are not turned on. Preferably, the processor is not turned on when the control unit 24 is on standby either; the whole unit 24 is then on standby. With the control unit 24 being put on standby during the intercycle duration 55, the first ultrasound transducer and the second ultrasound transducer are not supplied with electric power and are therefore also put on standby. In particular, the first clock makes it possible to activate the control unit so as to carry out each cycle, that is to say that the necessary electronic components of the control unit 24 are turned back on. The computation steps may then be carried out when the control unit 24 is activated during the cycles.

The inventors have remarked that a lack of precision of the computed flow rates may also result from an asymmetry in a state of the electronic components of the flowmeter between a subcycle carried out just after the electronic components of the control unit have been turned on and a subcycle carried out when the electronic components of the control unit have already been turned on for long enough to be stabilized. In particular, when the electronic components of the control unit are turned on, the operating state of the electronic components of the control unit may change before reaching a desired state (for example charging of the capacitors, internal temperature) during a transitory stabilization period (or "initialization" period). Thus, when a transmission cycle is carried out just after the electronic components of the control unit have been turned on, the first subcycle of this transmission cycle may be carried out during this transitory stabilization period whereas the second subcycle of the same transmission cycle will be carried out after the transitory stabilization period. Thus, this transitory stabilization period may skew the flow rate measurements because the operating state of the electronic components of the control unit is different between two subcycles of the same transmission cycle if the flow rate is computed only as a function of the transmission times of the ultrasound waves transmitted during this transmission cycle.

The fact of putting the control unit in sleep mode during the intercycle durations 55 and of reversing the order of the subcycle A and the subcycle B between two successive transmission cycles makes it possible to compensate for the errors induced by the stabilization period of the control unit. In particular, the state of the electronic components of the flowmeter during the first subcycle carried out (for example, a subcycle A) of a given transmission cycle $C_i$ is similar to that during the first subcycle carried out (for example, a subcycle B) of a transmission cycle $C_{i+1}$ directly succeeding the cycle Ci. Specifically, these two first subcycles may each be carried out over a stabilization period of the control unit. Likewise, the state of the electronic components of the flowmeter during the second subcycle carried out (for example, a subcycle B) of the cycle $C_i$ is similar to that during the second subcycle carried out (notably a subcycle A) of the cycle $C_{i+1}$. The errors which may result from the stabilization period of the control unit are thus compensated for. Thus, a flow rate measurement method according to the invention makes it possible to improve the precision of the computed flow rates.

Moreover, the fact of not turning on the electronic components of the control unit, that is to say of putting the control unit in sleep mode, during the intercycle durations 55 makes it possible to reduce energy consumption of the flowmeter.

The invention may be the subject of numerous variants and applications other than those described above. In particular, it goes without saying that, unless stated otherwise, the various structural and functional features of each of the embodiments described above should not be considered to be combined with and/or intimately and/or inextricably linked to one another but, on the contrary, to be mere juxtapositions. Moreover, the structural and/or functional features of the various embodiments described above may be the subject, as a whole or in part, of any different juxtaposition or any different combination. For example, the pipe 21 may be contained in the flowmeter, this pipe then having connecting members at its longitudinal ends so as to be able to connect the pipe to a pipe network.

Moreover, the flowmeter may incorporate more than one pair of ultrasound transducers. A processing unit may then be associated with each pair of transducers. As a variant, a single processing unit may successively control the various pairs of transducers.

The invention claimed is:

1. A method for measuring the flow rate of a fluid in a pipe, the flow rate being measured using at least two ultrasound transducers, the method comprising generating successive cycles, referred to as transmission cycles, which is controlled by a control unit, each transmission cycle comprising:

a subcycle A comprising:

a step of a first ultrasound transducer from among said at least two ultrasound transducers transmitting an ultrasound wave, a step of a second ultrasound transducer from among said at least two ultrasound transducers receiving said ultrasound wave, a step of measuring a time for the ultrasound wave to be propagated from the first ultrasound transducer to the second ultrasound transducer, a subcycle B comprising:

a step of the second ultrasound transducer transmitting an ultrasound wave, a step of the first ultrasound transducer receiving said ultrasound wave, a step of measuring a time for the ultrasound wave to be propagated from the second ultrasound transducer to the first ultrasound transducer, the first subcycle A and the subcycle B of the same transmission cycle succeeding one another in a given order, wherein the order of the subcycle A and the subcycle B of a given transmission cycle is reversed with respect to the order of the subcycle A and the subcycle B of a transmission cycle directly preceding said given transmission cycle, and in that said method comprises at least one fluid flow rate computation step in which a flow rate of the fluid flowing in the pipe is computed on the basis of an average between:

a difference between the propagation time measured for the subcycle A and the propagation time measured for the subcycle B of the same given transmission cycle, and a difference between the propagation time measured for the subcycle A and the propagation time measured for the subcycle B of the same transmission cycle directly succeeding the given transmission cycle, wherein a given first transmission cycle is separated from a second transmission cycle directly preceding the first transmission cycle by a duration, referred to as the intercycle duration, which is greater than or equal to 15 ms, said method further comprising a step of at least partially putting the control unit on standby between a first transmission cycle and a second transmission cycle, wherein when the control unit is turned on, the subcycle A and the subcycle B are each carried out over a stabilization period of the electronic components of the control unit, the ultrasound wave transmitted during the subcycle A and the ultrasound wave transmitted during the subcycle B of each transmission cycle each being transmitted over a predefined transmission time interval.

2. The method as claimed in claim 1, wherein said intercycle duration is between 125 ms and 2000 ms.

3. The method as claimed in claim 1, in which the subcycle A and the subcycle B of the same transmission cycle are separated from one another by a duration, referred to as the intracycle duration, which is less than or equal to 10 ms.

4. The method as claimed in claim 3, wherein said intracycle duration is between 1 ms and 10 ms.

5. The method as claimed in claim 1, wherein the predefined transmission time interval is less than 1 μs.

6. The method as claimed in claim 1, in which the ultrasound wave is generated by a transducer operating as a transmitter on the basis of a square electrical pulse.

7. The method as claimed in claim 1, in which the fluid flow rate is determined on the basis of a predetermined table in which propagation time difference results are associated with flow rates.

8. A flowmeter comprising:

at least two ultrasound transducers which are adapted to be joined to a pipe, a control unit programmed to control generation of successive cycles, referred to as transmission cycles, each transmission cycle comprising:

a subcycle A comprising:

a step of a first ultrasound transducer from among said at least two ultrasound transducers transmitting an ultrasound wave, a step of a second ultrasound transducer from among said at least two ultrasound transducers receiving said ultrasound wave, a step of measuring a time for the ultrasound wave to be propagated from the first ultrasound transducer to the second ultrasound transducer, a subcycle B comprising:

a step of the second ultrasound transducer transmitting an ultrasound wave, a step of the first ultrasound transducer receiving said ultrasound wave, a step of measuring a time for the ultrasound wave to be propagated from the second ultrasound transducer to the first ultrasound transducer, the subcycle A and the subcycle B of the same transmission cycle succeeding one another in a given order, wherein the order of the subcycle A and the subcycle B of a given transmission cycle is reversed with respect to the order of the subcycle A and the subcycle B of a transmission cycle directly preceding said given transmission cycle, wherein a given first transmission cycle is separated from a second transmission cycle directly preceding the first transmission cycle by a duration, referred to as the intercycle duration, which is greater than or equal to 15 ms, and in that the control unit is programmed to carry out at least one fluid flow rate computation step in which a flow rate of the fluid flowing in the pipe is computed on the basis of an average between:

a difference between the propagation time measured for the subcycle A and the propagation time measured for the subcycle B of the same given transmission cycle, and a difference between the propagation time measured for the subcycle A and the propagation time measured for the subcycle B of the same transmission cycle directly succeeding the given transmission cycle, said control unit being at least partially on standby between a first transmission cycle and a second transmission cycle, wherein when the control unit is turned on, the subcycle A and the subcycle B are each carried out over a stabilization period of the electronic components of the control unit and in the same state of instability of the electronic components of the control unit, the ultrasound wave transmitted during the subcycle A and the ultrasound wave transmitted during the subcycle B of each transmission cycle each being transmitted over a predefined transmission time interval.

9. The flowmeter as claimed in claim 8, wherein said flowmeter comprises said pipe on which the two ultrasound transducers are mounted, this pipe having two longitudinal ends comprising a connecting member.

* * * * *